A. HARTH.
ELECTRIC HEATER.
APPLICATION FILED MAR. 19, 1919.

1,318,554.

Patented Oct. 14, 1919.
2 SHEETS—SHEET 1.

Witnesses:

Inventor
August Harth
By his Attorneys

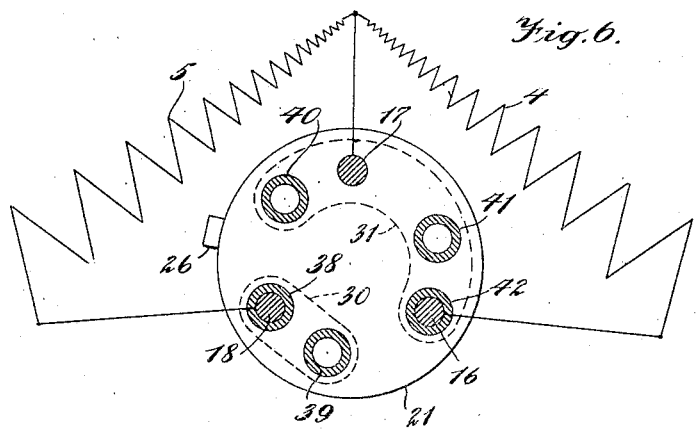
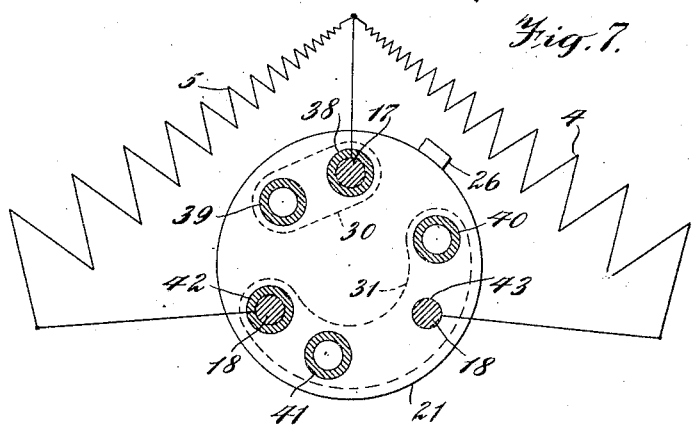
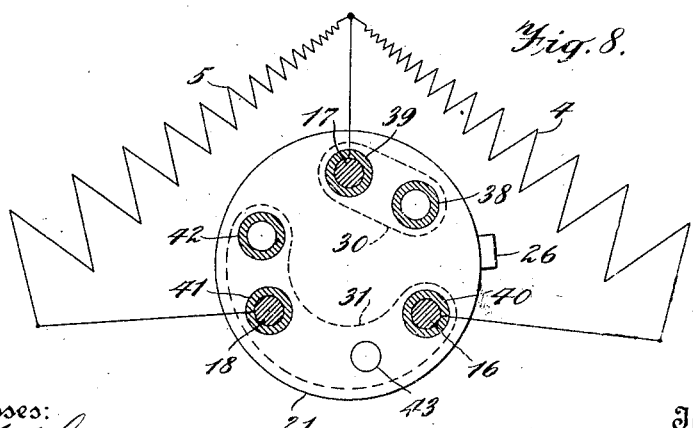

UNITED STATES PATENT OFFICE.

AUGUST HARTH, OF CHATHAM, NEW JERSEY, ASSIGNOR TO REDTOP ELECTRIC COMPANY, INC., A CORPORATION.

ELECTRIC HEATER.

1,318,554.  Specification of Letters Patent.  Patented Oct. 14, 1919.

Continuation of application Serial No. 859,002, filed August 28, 1914. This application filed March 19, 1919. Serial No. 283,659.

*To all whom it may concern:*

Be it known that I, AUGUST HARTH, a citizen of the United States, residing at the city of Chatham, in the county of Morris and State of New Jersey, have invented certain new and useful Improvements in Electric Heaters, of which the following is a full, clear, and exact description.

This invention relates to electric heaters and more particularly to the arrangement of the heating units and the means for connecting them to an electric circuit and for controlling the current supply to thereby regulate the degree of heat generated.

In the common forms of electric heaters, such as sad-irons, toasters, vessels of various kinds, portable stoves and furnaces, it has heretofore been the usual, if not the invariable, practice to utilize a plug and socket attachment to detachably connect the heater to a source of current supply, and to provide an additional means for regulating or controlling current supply or the path of current through the heating units. One common manner in which this has been done, has been to arrange the heating units in series, and to provide a switch or controller on the instrument to successively cut out the units, thus decreasing the resistance of the circuit and increasing the current which passes through the remaining units. This method of control will give the desired degree of heat, since the heat generated in an electrical circuit varies as the square of the current and directly as the resistance. Another manner has been to arrange the heating units in parallel, and to provide a controller or switch on the instrument, which is arranged to successively cut them in and out of circuit.

This application is a continuation of my application Serial No. 859,002, filed Aug. 28, 1914.

It is the object of the present invention to entirely eliminate this switch or controller, and to provide a plug and socket attachment which will serve as the regulating means, as well as the means for detachably connecting the heating units to the source of current, and to also provide a construction in which the heat generated may be regulated with the greatest ease and facility, by merely varying the relative positions of the plug and socket.

In accordance with these objects, the invention consists in arranging a plurality of terminals on the instrument, which are connected to the heating units, and in providing a plurality of terminals carried by a detachable plug, which are adapted to coact with certain of the terminals on the instrument in different positions of the plug to thereby regulate the amount of current in the heating units, as well as connecting them to a source of current supply.

More specifically, the invention consists of heating units connected to terminals located on the instrument, which connections are so arranged that the heating coils may be connected in series or in parallel, or only one of the heating units connected to the source of current, by means of a plug, which has a plurality of terminals adapted to coact with various terminals on the instrument, depending upon the position of the plug, the terminals on the plug being connected to a source of current supply.

For the purposes of illustration, the invention has been shown associated with an electric sad-iron, which is one of the principal adaptations to which the present invention may be put, but the invention is equally applicable to use with any of the common forms of electric heaters, and it is not the intention to be limited to any particular embodiment, but only by the scope of the appended claims.

Figure 3:
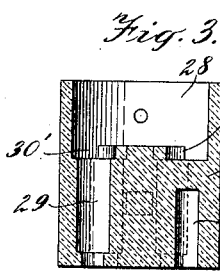
Figure 4:
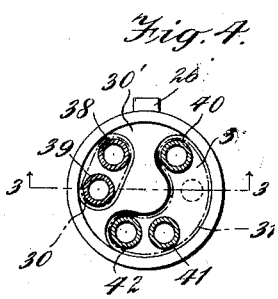
Figure 5:
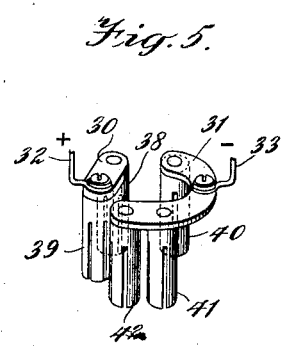

Figs. 3, 4 and 5 are details of the plug construction, Fig. 3 being a central longitudinal section of the line 3—3 of Fig. 4; and Figs. 6, 7 and 8 are diagrammatic views illustrating the connections of the heating units and the plug and socket attachment.

Figure 1:
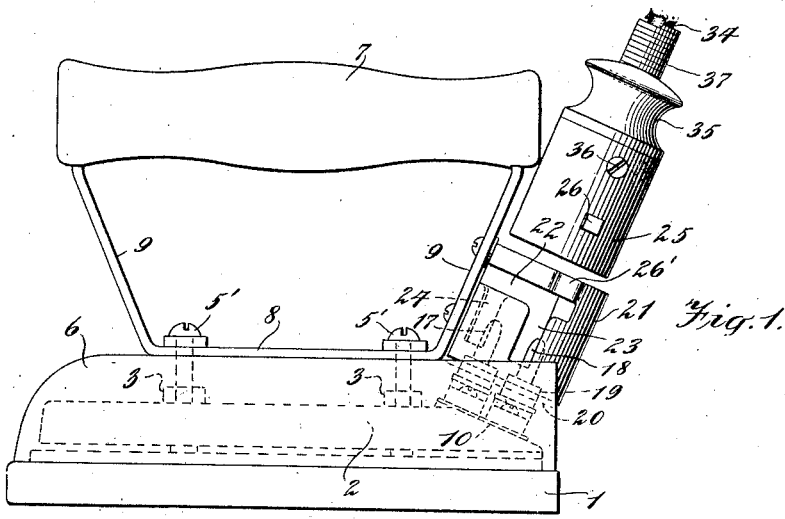
Figure 1 is a side elevation of an electric sad-iron, embodying the features of the present invention.

In Fig. 1, an electric sad-iron is shown, which has a solid base-plate 1, of a suitable size and shape to be used for ironing clothes and the like. Secured to the base-plate 1 is a second plate 2, which is of the same shape but of a slightly smaller size. This plate may be secured to the base-plate 1 in any suitable manner, as by bolts 3. The resistance units are adapted to be interposed between these two plates, which units are not shown in Fig. 1 of the drawing, but consist of the usual form of resistance units used with sad-irons of this character, comprising coils or windings which are suitably insulated by means of layers of mica, or otherwise.

Figure 2:
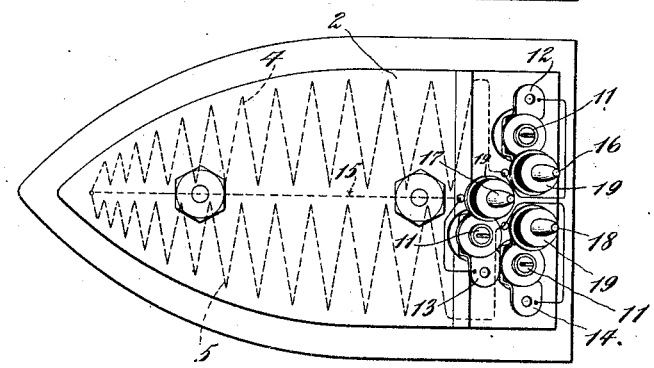
Fig. 2 is a plan of Fig. 1, with the cover of the iron removed.

In Fig. 2, resistance units 4 and 5 are shown somewhat diagrammatically, two coils or units being shown, which extend substantially from the toe of the iron to the heel thereof, each unit being arranged so as to heat substantially half of the base plate. Arranged upon the base plate 1, and inclosing the plate 2, is a hollow cover or a casing 6, which is secured to the base plate 1 in any suitable manner, as by screws 5', which are received at their lower ends in threaded holes in the top of the bolts 3. A handle 7 is positioned in place on the iron by an integral U-shaped piece 8, having upstanding arms 9, to which the ends of the handle 7 are secured, while the screws 5' also pass through openings in the piece 8 and secure it to the cover 6.

The broad end or heel of the metallic plate 2 is beveled, as at 10, and secured to the surface thus formed, as by set-screws 11, are a plurality of terminal plates, which, in the particular embodiment of my invention shown, are three in number, and are designated 12, 13 and 14, these plates being preferably insulated from the plate by means of washers of hard rubber, or other insulating material. The ends of each of these plates are offset from their middle portions, forming terminals, to which are connected the heating units 4 and 5; the heating unit 4 is connected at one end to the terminal 12, the heating unit 5 is connected at one end to the terminal 14, and the other two ends of the heating units 4 and 5 are connected to a common conductor 15, which is connected at its other end to the terminal 13. Carried upon the other ends of each of the terminal plates are plug terminals, which have been designated 16, 17 and 18, which plug terminals are adapted to be engaged by the socket terminals carried by the plug or detachable member, as will be later referred to. Surrounding each of the plug terminals are insulating bushings 19, which preferably project through openings in the cover 6. The surface of the cover surrounding these openings is beveled, as at 20, so that this surface will be normal to the plug terminals and will permit the plug, which will be hereinafter described, to fit down to a greater depth upon the plug terminals. Secured to the rear arm 9 is a sleeve 21, preferably of thin, metallic material, which is provided with a circumferential slot 22 therein, from which project downwardly-extending longitudinally-disposed slots 23 and 24, there being another slot diametrically opposed to slot 23.

A cylindrically-shaped base 25 of a detachable plug which is of slightly less diameter than the sleeve 21, carries on its peripheral surface a lug 26, which is adapted, when the plug is inserted into place, to pass downwardly through a groove 26', formed in the sleeve, into the slot 22, and to later rest in one of the slots 23 or slot 24, according to the different positions of the plug, as will be later referred to.

The base 25 is of insulating material, and has a cylindrical chamber 28 formed in one end thereof, while in its other end a plurality of cylindrical chambers 29, of much less diameter, are arranged parallel to the axis of the base, the chambers 29 being in open communication with chamber 28. The bottom surface of the chamber 28 is recessed, as at 30' and 31', to provide seats for conductor plates 30 and 31, which are connected to the positive and negative wires 32 and 33, which wires pass up through the insulated cord 34, and are connected at their other end to a suitable source of current supply.

Secured to the upper end of the base 25 of the plug is an annular collar 35, which has a depending sleeve, not shown, adapted to engage the walls of the cylindrical chamber 28, and is secured in place by a set-screw 36. The cord 34 passes through the centrally-disposed opening in the collar 35, while surrounding the lower end of the cord is a helically coiled closed spring 37, which is adapted to prevent the cutting of the cord at this point. Only a portion of this spring is shown, but its use with sad-irons of this character is common, and forms no part of the present invention.

The conductor plate 30 has depending from it two socket terminals 38 and 39, which are preferably slotted longitudinally of their length to impart to them the necessary resiliency to closely engage the plug terminals 16, 17 and 18, carried by the instrument proper. These socket terminals are adapted to fit in the chambers 29, the plate 30 resting in the seat or recess 30'. In the same manner, the conductor plate 31 is adapted to have attached thereto three depending socket terminals 40, 41 and 42, which fit into the other of the chambers 29, with the plate 31 fitting in the recess 31'. An additional longitudinal socket 43 is also provided in the base portion 25, in which no socket terminal is placed so that, as will be clear from Fig. 4, there are six sockets into which the plug terminals 16, 17 and 18 are adapted to fit, which sockets are so arranged that the plug may be turned to bring different sets of the sockets into engagement with the three plug terminals on the instrument.

Referring to the diagrams of the connections, Fig. 6 shows the position of the plug for the first or low heat of the iron. Since the socket terminals 38 and 42 are respectively engaging the plug terminals 18 and 16, the current passes in through the positive wire 32, which is connected to a source of current to plate 30, and then through socket terminal 38, plug terminal 18, to the heating unit 5, through the heating units 5 and 4, in series, to plug terminal 16, and then through the socket terminal 42 to the negative side of the line, the blind socket 43 receiving the terminal plug 17. The current will therefore pass through the heating units in series, and since the resistance of these units is relatively high, a small amount of current will be supplied to the iron, thus giving a comparatively low heat. To obtain a higher heat, the plug is disconnected and again placed upon the plug terminals in the position shown in Fig. 7, in which the socket 43 engages the plug terminal 18, cutting the heating unit 4 out of circuit, the current then passing through the heating unit 5 alone, since the ends of this unit are connected to the source of current supply by the socket terminals 38 and 42. The resistance of the circuit is, therefore, materially reduced and the amount of heat generated will thereby be increased, since the heat generated in an electric circuit varies as the square of the current, and directly as the resistance, or in other words, according to the formula $C^2R$, in which C designates the current, and R the resistance.

For the third, or highest, heat the plug is inserted upon the plug terminals, in the position shown in Fig. 8, in which the socket terminal 39 is electrically connected to plug terminal 17, and socket terminals 41 and 40, respectively, connected to plug terminals 18 and 16. The current then flows over the common conductor 15, where it divides and passes through the heating units 5 and 4 in parallel, returning to the negative side of the line through the plate 31, which is common to terminals 40 and 41. Since both of the heating units are in parallel, each unit will generate practically the same amount of heat as the one unit used in the intermediate connection.

It will therefore be seen that by utilizing a detachable plug and socket attachment of the character described, the path of current through the heating coils or units, is controlled while the units are simultaneously connected to a source of current supply, which does away entirely with the necessity for a separate controller switch positioned on the instrument, for regulating the current, and producing an extremely simple construction which may be readily manipulated by the person using the iron.

If desired, a greater number of heating units may be used, in which instance a detachable plug is used, which would carry sufficient terminals to successively cut in and out the heating units or to vary their circuit arrangement by varying the position of the plug, and it is not the intention to limit the invention to the specific embodiment shown, but only by the scope of the appended claims.

I claim:

1. The combination with an electric heater having two heating units, a plug terminal electrically connected to one end of each of said units, and a third plug terminal electrically connected in common to the other end of each of said units, a plug having a plurality of complementary socket terminals adapted to be electrically connected to a source of electric current, one socket in said plug having no electrical connections whereby upon varying the position of said plug one unit or both of said units may be connected in series or in parallel to a source of current supply.

2. In combination, an electric heater having a plurality of heating units and terminals connected to said units, a guide sleeve carried by said heater, said sleeve having a plurality of bayonet slots therein and a plug carrying a lug adapted to fit into said sleeve, said lug resting in the respective slots in said sleeve in corresponding positions of the plug, and terminals carried by said plug adapted to engage with different terminals on said heater in different positions of said plug to vary the path of current through said heating units.

3. In an electric sad iron, in combination heating circuits therein, a handle, a socket secured to the handle, three plug terminals mounted in said socket and symmetrically disposed therein, and a plug of insulating material adapted for insertion in said socket comprising six symmetrically disposed sockets therein, five of which are provided with electrical terminals, the other affording an insulating socket to receive one of the plug terminals.

4. In an electric sad iron, in combination heating circuits therein, a socket, three plug terminals mounted in said socket and symmetrically disposed therein, and a plug of insulating material adapted for insertion in said socket comprising six symmetrically disposed sockets therein, five of which are provided with electrical terminals, the other affording an insulating socket to receive one of the plug terminals.

In witness whereof, I subscribe my signature.

AUGUST HARTH.